United States Patent
Tang et al.

(10) Patent No.: US 11,459,650 B2
(45) Date of Patent: Oct. 4, 2022

(54) OXIDATION RESISTANT BOND COAT LAYERS, PROCESSES FOR COATING ARTICLES, AND THEIR COATED ARTICLES

(71) Applicant: United Technologies Corporation, Farmington, CT (US)

(72) Inventors: Xia Tang, West Hartford, CT (US); David C. Jarmon, Hendersonville, NC (US); James T. Beals, West Hartford, CT (US); R. Wesley Jackson, West Hartford, CT (US); Paul Sheedy, Bolton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 49 days.

(21) Appl. No.: 15/789,393

(22) Filed: Oct. 20, 2017

(65) Prior Publication Data

US 2019/0119803 A1 Apr. 25, 2019

(51) Int. Cl.
| | |
|---|---|
| C23C 4/10 | (2016.01) |
| C23C 24/08 | (2006.01) |
| C23C 28/04 | (2006.01) |
| C23C 4/11 | (2016.01) |
| C04B 41/00 | (2006.01) |
| C23C 4/12 | (2016.01) |
| C04B 41/52 | (2006.01) |

(Continued)

(52) U.S. Cl.
CPC .............. *C23C 4/10* (2013.01); *C04B 41/009* (2013.01); *C04B 41/52* (2013.01); *C04B 41/89* (2013.01); *C23C 4/11* (2016.01); *C23C 4/12* (2013.01); *C23C 4/129* (2016.01); *C23C 4/134* (2016.01); *C23C 24/08* (2013.01); *C23C 28/042* (2013.01); *F01D 5/282* (2013.01); *F01D 5/284* (2013.01); *F01D 5/288* (2013.01); *F01D 25/005* (2013.01); *F05D 2220/80* (2013.01); *F05D 2230/40* (2013.01); *F05D 2230/90* (2013.01); *F05D 2300/211* (2013.01); *F05D 2300/2261* (2013.01)

(58) Field of Classification Search
None
See application file for complete search history.

(56) References Cited

U.S. PATENT DOCUMENTS

| | | |
|---|---|---|
| 5,677,060 A | 10/1997 | Terentieva et al. |
| 7,951,459 B2 | 5/2011 | Tang et al. |

(Continued)

FOREIGN PATENT DOCUMENTS

EP 1925694 A2 5/2008

OTHER PUBLICATIONS

European Search Report dated Mar. 6, 2019 issued for corresponding European Patent Application No. 18201642.8.

*Primary Examiner* — Kenneth J Stachel
(74) *Attorney, Agent, or Firm* — Bachman & LaPointe, P.C.

(57) ABSTRACT

A coated article including an article having a surface; an oxidation resistant bond coat layer deposited on the surface, the oxidation resistant bond coat layer comprising a healing silica matrix and at least one oxygen scavenger forming a metal silicide network dispersed within the healing silica matrix; and a top coat layer disposed upon the oxidation resistant bond coat layer, whereby the oxidation resistant bond coat layer is operable to seal a crack in the top coat layer.

3 Claims, 2 Drawing Sheets

(51) Int. Cl.
*C04B 41/89* (2006.01)
*F01D 5/28* (2006.01)
*C23C 4/129* (2016.01)
*C23C 4/134* (2016.01)
*F01D 25/00* (2006.01)

(56) References Cited

U.S. PATENT DOCUMENTS

| | | |
|---|---|---|
| 8,470,457 B2 | 6/2013 | Schmidt |
| 9,611,181 B2 | 4/2017 | Tang et al. |
| 2008/0187767 A1* | 8/2008 | Tang .................... C04B 41/009 |
| | | 428/450 |
| 2013/0344319 A1 | 12/2013 | Zhu et al. |
| 2015/0159492 A1 | 6/2015 | Hass |
| 2015/0247245 A1* | 9/2015 | Wali .................... F01D 25/005 |
| | | 416/241 B |
| 2016/0376495 A1* | 12/2016 | Nguyen ................ C09K 8/905 |
| | | 166/280.2 |
| 2017/0073277 A1* | 3/2017 | Shim .................. C04B 41/4543 |
| 2017/0167276 A1 | 6/2017 | Luthra |
| 2017/0328217 A1* | 11/2017 | Gallier .................... F01D 5/147 |
| 2019/0071769 A1* | 3/2019 | Kirby .................... C23C 16/045 |

* cited by examiner

OXIDATION RESISTANT BOND COAT LAYERS, PROCESSES FOR COATING ARTICLES, AND THEIR COATED ARTICLES

BACKGROUND

The present disclosure relates to coatings and, more particularly, to oxidation protection coatings.

Gas turbine engines and hypersonic engines that are currently being pursued for enhanced performance and improved operational efficiencies will require stable lightweight materials with robust mechanical properties across a wide temperature spectrum. Due to these stringent demands, only a limited number of refractory materials such as carbon or ceramic materials, carbon fiber or silicon carbide fiber based composites, monolithic ceramics such as silicon nitride and silicon carbide, and refractory based alloys such as those based on molybdenum and niobium can be used. While possessing adequate high temperature mechanical properties, these materials suffer from inadequate high temperature oxidation resistance.

Silicon based non-oxide ceramics, such as SiC/SiC CMCs, monolithic silicon nitride and silicon carbide are attractive high temperature materials for gas turbine applications. These materials may exhibit material recession in the gas turbine combustion environment. The recession mechanism responsible for silicon-based material is accelerated oxidation and material loss caused by high partial pressure of water vapor in combustion environments. Their mechanical properties deteriorate as a result of oxidation and recession. An environmental barrier coating is therefore required to provide protection from the accelerated attack by water vapor.

Typical oxidation protective coatings define a viscosity range that will allow the glass to flow at high temperature, but this may not be practical in gas turbine applications where coating durability is required.

SUMMARY

A coated article according to one disclosed non-limiting embodiment of the present disclosure includes an article having a surface; an oxidation resistant bond coat layer deposited on the surface, the oxidation resistant bond coat layer comprising a healing silica matrix and at least one oxygen scavenger forming a metallic, intermetallic, or metal silicide network dispersed within the healing silica matrix; and an environmental protective top coat layer disposed upon the oxidation resistant bond coat layer, whereby the oxidation resistant bond coat layer is operable to repair a crack in the top coat layer.

A further embodiment of any of the foregoing embodiments of the present disclosure includes metallic, intermetallic, or metal silicide network embedded in the silicon oxide based healing silica matrix, the healing silica matrix contains glass phases having a viscosity of 102 poise to 107 poise at a temperature of 1,292 F (700 C) to 3,272 F (1,800 C) to flow into the cracks.

A further embodiment of any of the foregoing embodiments of the present disclosure includes that the metallic, intermetallic, or metal silicide network comprises 30-90% by volume of the oxidation resistant bond coat layer.

A further embodiment of any of the foregoing embodiments of the present disclosure includes interstices in the metallic, intermetallic, or metal silicide network is at least partially filled with the silica based healing matrix to protect the surface and provide the healing function.

A further embodiment of any of the foregoing embodiments of the present disclosure includes that the metallic, intermetallic, or metal silicide network comprises an alloy of multiple metal silicides and borides.

A further embodiment of any of the foregoing embodiments of the present disclosure includes that the alloy of multiple metal silicides and borides comprises transition metal, refractory metal and rare earth metal, and aluminum silicides or borides and mixtures thereof.

A further embodiment of any of the foregoing embodiments of the present disclosure includes that the healing silica matrix comprises any one of the following: silicon containing ceramics, silicon containing oxides, and mixtures thereof.

A further embodiment of any of the foregoing embodiments of the present disclosure includes that the top coat layer comprises at least one of the following: refractory oxide material, rare earth oxides, mixed rare earth and refractory metal oxides, alkaline earth oxides, rare earth silicates, refractory metal silicates, mixed metal silicates, borosilicates, aluminum silicates, and mixtures thereof.

A further embodiment of any of the foregoing embodiments of the present disclosure includes that the refractory oxide material is selected from the group consisting of $Ta_xO_y$ (where $x=1$ to 3 and $y=1$ to 5), $Nb_xO_y$ (where $x=1$ to 3 and $y=1$ to 5), MgO, CaO, SrO, BaO, $SiO_2$, $HfO_2$, $TiO_2$, $ZrO_2$, $Al_2O_3$, $Y_2O_3$, $La_2O_3$, rare earth oxides, yttrium silicate, hafnium silicate, ytterbium silicate and mixtures thereof.

A further embodiment of any of the foregoing embodiments of the present disclosure includes that the at least one oxygen scavenger comprises a silicide of any one or more of the following: molybdenum, tantalum, chromium, titanium, hafnium, zirconium, yttrium, ytterbium and mixtures thereof; a boride of any one or more of the following: molybdenum, tantalum, chromium, titanium, hafnium, zirconium, yttrium, ytterbium and mixtures thereof; or both of any one or more of the silicides, and any one or more of the borides.

A further embodiment of any of the foregoing embodiments of the present disclosure includes that the oxidation resistant bond coat layer has a thickness of between 0.1 and 20 mils.

A further embodiment of any of the foregoing embodiments of the present disclosure includes that the article comprises any one of the following: turbine engine components, hypersonic engine components, and hypersonic components.

A process for applying an oxidation resistant bond coat layer to an article according to one disclosed non-limiting embodiment of the present disclosure includes forming a slurry consisting of one or multiple silicide and boride powders with silica containing matrix constituents, the silica containing matrix constituents comprising at least one of the following: silica, silicon oxycarbide (SiOC), silicon carbide (SiC), aluminosilicate, borosilicate, alkaline earth metal oxides, glass, refractory metal oxides and rare earth metal oxides; coating an article with the slurry to form a slurry coated article; heat treating the slurry coated article to form a healing silica matrix and metallic, intermetallic, or metal silicide network to form an oxidation resistant bond coat layer on a surface of the article; and applying a top coat layer onto the oxidation resistant bond coat layer.

A further embodiment of any of the foregoing embodiments of the present disclosure includes that the heat treating the healing silica matrix comprises forming the metallic, intermetallic, or metal silicide network embedded in the healing silica matrix during a heat treatment in air.

A further embodiment of any of the foregoing embodiments of the present disclosure includes that the slurry forming step comprises forming a slurry consisting of at least 10% by volume to up to 70% by volume at least one silica based material containing glass phases having a viscosity of 102 poise to 107 poise at a temperature of 1,292 F (700 C) to 3,272 F (1,800 C), at least 30% by volume to up to 90% by volume of at least one oxygen scavenger selected from the group consisting of at least one silicide of molybdenum, chromium, titanium, hafnium, zirconium, yttrium, and mixtures thereof and a boride of at least one of the following: molybdenum, tantalum, chromium, titanium, hafnium, zirconium, yttrium and mixtures thereof, mullite to control viscosity of the slurry during the subsequent heat treatment step, and a liquid medium.

A further embodiment of any of the foregoing embodiments of the present disclosure includes that the top coat layer comprises at least one of the following: refractory oxide material, rare earth oxides, mixed rare earth and refractory metal oxides, alkaline earth oxides, rare earth silicates, refractory metal silicates, mixed metal silicates, borosilicates, aluminum silicates, or mixtures thereof.

A further embodiment of any of the foregoing embodiments of the present disclosure includes that the refractory oxide material is selected from the group consisting of TaxOy (where x=1 to 3 and y=1 to 5), NbxOy (where x=1 to 3 and y=1 to 5), MgO, CaO, SrO, BaO, $SiO_2$, $HfO_2$, $TiO_2$, $ZrO_2$, $Al_2O_3$, $Y_2O_3$, $La_2O_3$, rare earth oxides, yttrium silicate, hafnium silicate, ytterbium silicate and mixtures thereof.

A further embodiment of any of the foregoing embodiments of the present disclosure includes that the heat treating of the slurry coated article is performed under an inert atmosphere.

A further embodiment of any of the foregoing embodiments of the present disclosure includes heat treating the healing silica matrix in air, wherein a porosity in the metallic, intermetallic, or metal silicide network is filled and coated by the glass phase containing silica based healing matrix to protect the surface and provide the healing function when the temperature of the first heat treatment is below 2300 F-2550 F (1300-1400 C).

A further embodiment of any of the foregoing embodiments of the present disclosure includes that the second heat treatment is used to form the metallic, intermetallic, or metal silicide network at 2460 F-3000 F (1350-1650 C) in air.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

The oxidation resistant bond coat layer of the present application protects materials from oxidation in a range of temperatures from room temperature to up to at least 3000 F (1650 C) and greater. The oxidation resistant bond coat layer provides a metal silicide network in a healing matrix. The interstices between the metal silicide network is filled with and coated by silica based healing matrix containing glass phases to protect the substrate and provide the healing function. In embodiments, there is minimal porosity in the oxidation resistant bond coat layer.

The two phases, the metal silicide network and the glass containing silica based healing matrix, are interwound. The glass phases in the silica healing matrix melt at high temperature to seal cracks formed and heal the bond coat. This provides a stable coating at high temperature that prolongs service life. The healing matrix may be somewhat rigid to maintain a stable coating structure. Although especially applicable to low thermal expansion composite substrates such as C/SiC, SiC/SiC or SiC/SiNC and monolithic $Si_3N_4$, the architecture of the oxidation resistant bond coat layer is also applicable to other materials requiring oxidation protection over a broad temperature range to ensure optimal performance. The coefficient of thermal expansion (CTE) of the oxidation resistant bond coat layer can be adjusted by varying the volume fraction and type of the metal silicide or other metallic or intermetallic network and healing silica or other glassy matrix to minimize CTE mismatch between the layers of the oxidation resistant bond coat layer.

Figure 1:
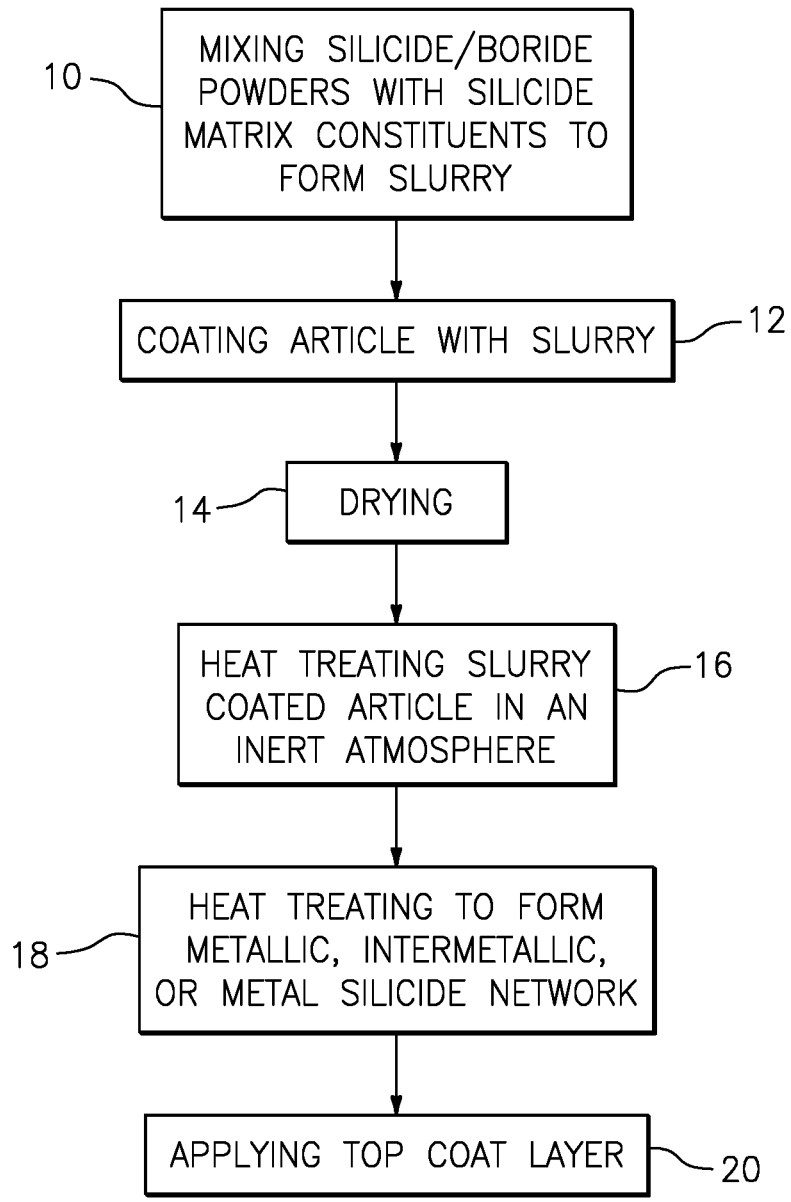
FIG. 1 is a representation of a flowchart of a process of the present application.

With reference now to FIG. 1, a flowchart representing one process for applying the oxidation resistant bond coat layer may comprise mixing (step 10) at least 10% by volume to up to 70% by volume of at least one silica or other glassy based material and at least 30% by volume to up to 90% by volume of at least one oxygen scavenger metal silicide or other metallic or intermetallic network in a liquid medium to form a slurry. In some examples, one or multiple silicide and boride powders (which operate as an oxygen scavenger/blocker) are mixed with silica containing matrix constituents, including at least one of the following: silica, silicon oxycarbide (SiOC), silicon carbide (SiC), aluminosilicate, borosilicate, alkaline earth metal oxides, glass, refractory metal oxides and rare earth metal oxides, to form the slurry.

The metallic or intermetallic network may comprise metal silicides, aluminides, borides, refractory metals and combinations thereof. A metal silicide network may comprise a metal silicide or an alloy of multiple metal silicides and borides. The metal silicides, aluminides, and borides include, but are not limited to, transition metals, refractory metals, rare earth metals and mixtures thereof. The glassy or silica based healing matrix may include, but not be limited to, silica, aluminosilicate, borosilicate, alkaline earth oxides, glass, refractory metal and rare earth oxides, etc.

Suitable liquid media includes, but is not limited to, water, alcohols, binders, terpineol, organic dispersants and solutions comprising the aforementioned materials, mixtures thereof, and the like. The aforementioned binders may be organic-based liquid media such as acrylic or inorganic-based liquid media such as colloidal silica.

Suitable silica based materials may comprise silica, modified silica, and the like. Modified silica may comprise silica modified by other compounds or elements, for example, silicates such as alkaline earth silicates, borosilicates, hafnium silicates, zirconium silicates, phosphates, glass, glass forming additives and mixtures thereof. The glass phases in silica based materials exhibit a viscosity of $10^2$ poise to $10^7$ poise in a temperature range of 1,292 F (700 C) to 3,272 F (1,800 C), to form a viscous glass phase material, that when heat treated, is suitable to heal cracks in the oxidation resistant bond coat. The silica based matrix surrounds and coats the oxygen scavenger network during the heat treatment steps to provide oxidation protection of the metallic or intermetallic network. The composite bond coat containing metallic or intermetallic network and silica based matrix has a rigid structure to resist creep at high temperatures. The oxidation resistant bond coat layer provides oxidation resistance by providing a barrier to oxygen flow to the article's surface, reacting with oxygen when small amount of oxygen diffused into the bond coat and healing of the bond coat cracks. In addition, as the oxidation resistant bond coat layer is exposed to oxidative operating conditions overtime, the oxidation resistant bond coat degrades and exposes the oxygen scavenger additive. The oxygen scavengers oxidize to form non-gaseous oxidation products such as metal oxides and $SiO_2$, $Al_2O_3$, $B_2O_3$, etc.

The $SiO_2$ is dense and protects the oxidation scavengers from further oxidation. $B_2O_3$ forms borosilicate glass phases and flows at elevated temperature to seal cracks and regenerates the glass phases in the silica based matrix, therefore prolong the life of the oxidation protective bond. The composite bond coat containing metallic or intermetallic network and healing silica based matrix accommodate mismatches of the coefficient of thermal expansion of the substrates and metallic or intermetallic materials in the bond coat layer. As a result, the oxidation resistant bond coat layer resists spallation and cracking.

An oxygen scavenger may be defined to be any element, compound or multiphase component that reacts with oxygen to form a relatively stable, non-volatile oxygen-containing compound or phase. Suitable oxygen scavengers may comprise silicides, aluminides, and/or borides of molybdenum, tantalum, chromium, titanium, hafnium, zirconium, yttrium, mixtures thereof, and the like. In addition, other refractory, rare earth or transition metals, other metals or intermetallics, silicon and boron and mixtures thereof may also be utilized as suitable oxygen scavengers, including those that form silicides, aluminides, and borides. The volume % of the oxygen scavenger within the layers of coating may preferably be in the range of about 30% to about 90% by volume and more preferably in the range of about 50% to about 80% by volume.

In some embodiments, a viscosity modifier may be added to silica based matrix in an amount sufficient to rheologically control the viscosity of the targeted glass phase. Suitable viscosity modifiers may include, but are not limited to refractory materials, metal oxides, mixed metal silicates, mixtures thereof, and the like. The silica based material may also include, as part of its composition, the viscosity modifier additive. Suitable viscosity modifier additives may include mullite, alkaline earth aluminosilicates including barium strontium aluminosilicate (BSAS) and strontium aluminosilicate (SAS), yttrium silicates, rare earth silicates, hafnium or zirconium silicate, oxides of hafnium, zirconium, titanium, silicon, yttrium, refractory, transition, and rare earth metals, tantalum, niobium, aluminum and mixtures thereof, and the like. In addition, these viscosity modifier additives may also be used to impart additional steam resistance.

Suitable mixing processes may include, but are not limited to, mechanical mixing techniques, manual mixing techniques, ultrasonics, cavitation, agitation, combinations comprising these techniques, and the like. For example, representative mechanical mixing techniques may include grinding, ball mixing, high energy milling (e.g., Spex), shear mixing, stirring, centrifugal mixing, combinations comprising at least one of the foregoing, and the like.

Next, a substrate such as that manufactured of a ceramic matrix composite (CMC), is coated (step 12) with the slurry. Any one or more of a number of coating techniques may be utilized. For example, suitable coating techniques may include, but are not limited to, thermal spraying, electrophoretic deposition, electrostatic deposition, preceramic polymer infiltration and pyrolysis, sol-gel, slurry coating, dipping, air-brushing, slurry painting or any combination thereof. In addition, suitable coating techniques may include high velocity oxygen fuel processes, low pressure plasma spray processes, and the like. When applying multiple layers of oxidation resistant bond coat layers, particularly suitable coating techniques include polymer impregnation processes, slurry coating, electrophoretic deposition, thermal spray, and combinations thereof. Each oxidation resistant bond coat layer should be disposed upon the article at a thickness of greater than or equal to 0.05 mils (0.00005 inch), preferably between 0.1 to 300 mils and ideally between 0.1 to 20 mils.

Once the slurry is applied, the organic binders/dispersant may form a film or residue upon the slurry coated substrate. If such residue remains, the slurry coated substrate may be dried (step 14) such that the residue is dried or "burned out." For example, the slurry coated substrate may be heated in air at 302 F (150 C) to 660 F (350 C) for 20 minutes to 60 minutes. Optionally, step 12 may be repeated as often as necessary to achieve the desired thickness, coating weight, other desired properties, and the like. The composition and microstructure of bond layer can be varied through the entire thickness of bond coat.

Next, the slurry coated substrate may be heat treated in an inert atmosphere, such as argon, (step 16) to form the healing silica matrix and metallic, intermetallic, or metal silicide network. The silica based material, oxygen scavenger, and optional alkaline earth material form a healing silica based matrix with the oxygen scavenger network interwound throughout the layer of the healing silica matrix. The heat treatment may be performed by any of a number of conventional techniques. The heat treatment temperature depends on the constituents of the slurry, and may range from 932 F (500 C) to 3,000 F (1,650 C). For example, a substrate coated with a slurry containing silica-based matrix materials and an oxygen scavenger may be heat treated in a temperature range of 2012 F (1100 C) to 2552F (1400 C) for a period of time sufficient to form the healing silica matrix and metallic, intermetallic, or metal silicide network.

The metallic, intermetallic, or metal silicide network can be formed by sintering a uniform composition of metals, intermetallics, or metal silicides/borides or by reacting single or multiple metal constituents with silicon and metal borides under the inert atmosphere at a temperature below the melting temperature of silicon (e.g., about 2550 F; 1400 C). In some cases, chemical reactions may occur between the metals, intermetallics, or metal silicide/borides (oxygen scavenger) and the components in silica matrix materials at temperatures higher than 1150 C in inert atmosphere to form gaseous products such as SiO(g). The heat treatment temperatures, therefore, should be below the reaction temperature 2190 F (1200 C) to form healing silica based matrix only and avoid bond coat decomposition. A second heat treatment in air at temperatures higher than 2372 F (1300 C) is required to form the metallic, intermetallic, or metal silicide network.

In some embodiments, the slurry coated substrate is then subjected to a second heat treatment in air, (step 18) to form metal silicide network when the first heat treatment in inert atmospheric is below 2372 F (1300 C). Not all the compositions need a second heat treatment in air, for example, when the first heat treatment were conducted at temperatures below 1350 C and the metal silicide would not otherwise form continuous network. The metals, intermetallics, or metal silicide sinter and form interconnected network in the healing silica matrix formed during the prior heat treatment (step 18) in air at temperature in the range of 2372 F-3002 F (1300 C-1650 C). This heat treatment in air avoids the formation of gaseous reaction products such as SiO (g) between silicide and silica based matrix. The healing silica matrix formed during the prior heat treatment surrounds and coats the oxygen scavenger surface and protects it from oxidation during heat treatment in air.

The metallic, intermetallic, or metal silicide network is formed through sintering of metal, intermetallic, or metal silicide particles. The silica formed on the surface of the metal, intermetallic, or metal silicide is dense and can protect the metal, intermetallic, or metal silicide from being quickly consumed thus increasing the longevity for the oxidation resistant bond coat layer. In one example, metal borides may be incorporated as part of the metallic, intermetallic, or metal silicide network. Metal borides may also reside in silica based matrix, outside of the network. Alternatively, the metal, intermetallic, or metal silicide network can be produced by silicide forming precursors, along with silica containing matrix constituents. The metals react with the silicon and boron/boride during heat treatment to form the metal, intermetallic, or metal silicide network that is embedded in the healing silica matrix.

The silica based matrix operates as a sealant to slow oxygen diffusion and protect the metal silicide from oxidizing too quickly. Some metals, intermetallics, or metal silicides, such as molybdenum disilicide, can oxidize relatively quickly at 930-1650 F (500-900 C) due to insufficient formation of a protective scale such as silica at this temperature range. The silica based matrix provides protection in this temperature range and contains glass phases (e.g., borosilicate glass, alkaline earth aluminum silicate glass, etc.) to provide the healing. The volume ratio of the metallic, intermetallic, or metal silicide network in one embodiment is 30-90% by volume of the oxidation resistant bond coat layer 120. The repetition need only be performed for steps 12 and 14 to build coating thickness and/or incorporate varying bond coat compositions. Multiple top coat layers with varying compositions can be applied to achieve a desired environmental protection and thermal expansion match among the substrate, the oxidation protection coating, and the top coat.

Figure 2:
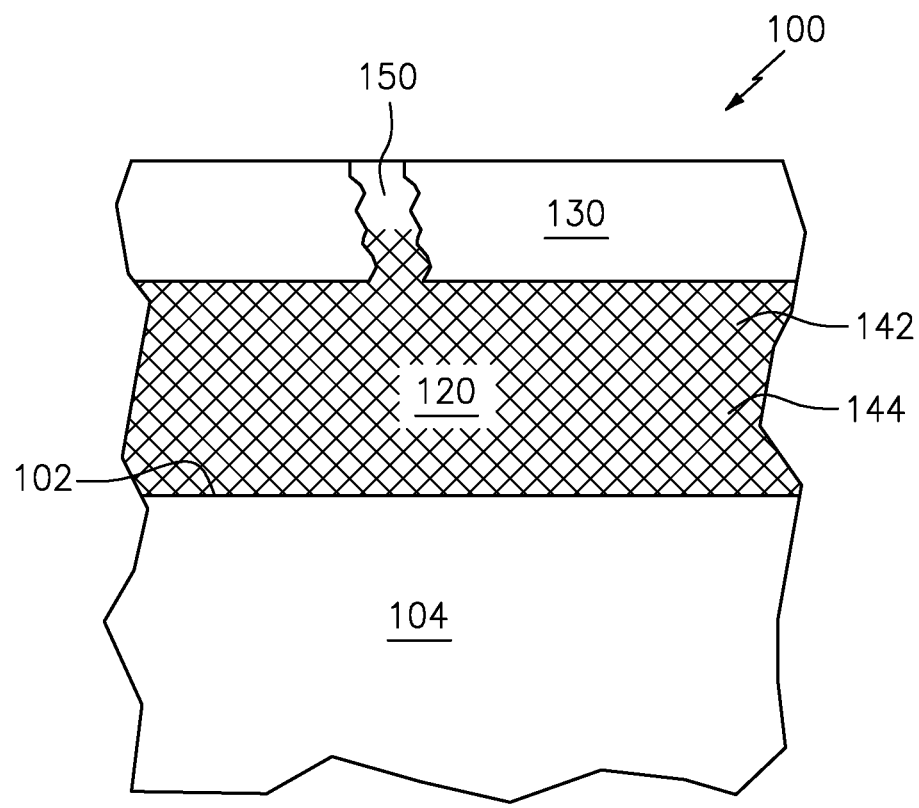
FIG. 2 is a representation of an article coated with an oxidation resistant bond coat layer of the present application.

Referring now to FIG. 2, an article 100 coated with the oxidation resistant bond coat layer 120 of the present application is schematically illustrated. The article 100 may comprise any component, part of a component, etc., that requires protection from oxidation across a temperature range up to 3,000 F (1,650 C). Such articles may include, but are not limited to, turbine engine components such as vanes, blades, nozzles, flaps, seals, shrouds, and the like, hypersonic engine components such as leading edges and heat exchangers, and hypersonic components such as hypersonic airfoil surfaces, and the like.

The article 100 may be manufactured of any suitable material, such as, for example, silicon-containing substrates to include but not be limited to, silicon-containing ceramics, silicon-containing metal alloys, etc. Suitable silicon-containing ceramics include, but are not limited to, silicon nitride, silicon carbide, silicon carbonitride, silicon oxycarbides, silicon carbide composites, silicon nitride composites, silicon oxynitrides, silicon aluminum oxynitrides, silicon nitride ceramic matrix composites, etc. Suitable silicon-containing metal alloys include, but are not limited to, molybdenum silicon alloys, niobium silicon alloys, iron silicon alloys, cobalt silicon alloys, nickel silicon alloys, tantalum silicon alloys, refractory metal silicides, etc. The article 100 may alternatively be manufactured of ceramic matrix composites, for example, ceramic fibers embedded in a ceramic matrix, thus forming a ceramic fiber reinforced ceramic. The matrix and fibers can comprise any ceramic material, whereby carbon and carbon fibers can also be considered a ceramic material.

The article 100 may have at least one surface 102 of a substrate 104 upon which the oxidation resistant bond coat layer 120 is disposed according to any of the processes described herein. In addition, the processes may be repeated so as to apply more than one layer of oxidation resistant bond coat layers 120.

The metallic, intermetallic, or metal silicide network 142 and the healing silica matrix 144 are combined together to provide maximum oxidation protection for the CMC substrate. The metallic, intermetallic, or metal silicide network 142 is embedded in the healing silica matrix 144 such that the oxidation resistant bond coat layer 120 readily binds strongly to the substrate 104 to provide coating structure stability against blow off and creep under high surface gas velocities and the forces generated in a gas turbine engine application. The oxygen scavengers dispersed throughout the resultant oxidation resistant bond coat layer 120 circumvent potential problems associated with coefficient of thermal expansion mismatches which may result in spallation and cracking. The oxygen scavenger reacts with oxygen diffused into the oxygen resistant coating 120 and removes the oxygen. That is, the oxygen scavenger stops oxygen from reaching the substrate 104.

A top coat layer 130 may be applied (step 20) upon the silica-based oxidation resistant bond coat layer 120 to impart additional protection from oxidation or steam. The top coat layer 130 may be an environmental barrier coating of at least one of, yttrium silicates and rare earth silicates, hafnium silicate, and RE oxides and hafnium oxide for protection against combustion gas in turbine environment. Such top coat layers 130 may contain a refractory material including oxides, rare earth oxides, metal silicates, rare earth silicates or mixtures thereof. Suitable refractory oxide materials may include, but are not limited to, at least one of the following oxides: $Ta_xO_y$ (where x=1 to 3 and y=1 to 5), $Nb_xO_y$ (where x=1 to 3 and y=1 to 5), MgO, CaO, SrO, BaO, $SiO_2$, $HfO_2$, $TiO_2$, $ZrO_2$, $Al_2O_3$, $Y_2O_3$, $La_2O_3$, rare earth oxides, HfSiO4, Y2Si2O7, Y2SiO5, rare-earth silicates mixtures thereof, and the like. Suitable coating techniques to apply the top coat layer 130 may include, but are not limited to, thermal spraying, chemical vapor deposition, physical vapor deposition, electrophoretic deposition, electrostatic deposition, preceramic polymer pyrolysis, sol-gel, slurry coating, dipping, air-brushing, sputtering, slurry painting, high velocity oxygen fuel processes, low pressure plasma spray processes, and the like.

As the oxidation resistant bond coat layer 120 is exposed to oxidative operating conditions, the oxidation resistant bond coat layer degrades and micro-cracks forms in the healing silica matrix 144. The oxygen scavengers of the healing silica matrix 144 form non-gaseous oxidation products such as metal oxides and $SiO_2$, $Al_2O_3$, $B_2O_3$, metal silicates, etc. The metal silicates add to, and rebuild, the top coat layer 130. The metal oxide/metal silicates migrate at elevated temperature, to repair cracks 150 (illustrated schematically) in top coat 130. The function of the top coat is to provide environmental protection against water vapor attack at high temperatures. The water vapor causes recession of silicon bearing materials at high temperatures Additional metal oxide/metal silicate phases are formed in situ for healing of the top coat layer 130 by incorporating non-volatile metal oxide/metal silicate forming phases, such as metal borides.

Example components in hypersonic and/or gas turbine applications require environmental protection in different conditions that may or may not include water vapor. For example, scramjet engine leading edges require dry oxidation resistance up to and greater than 3,000 F (1,650 C) while cooled CMC flow path components, e.g., heat exchangers, require protection under relatively high water vapor conditions. Multiple layers of the oxidation resistant bond coat layer of the present application may serve both purposes. Multiple layers may provide additional protection against steam and may be used to modify the heat flux through the oxidation resistant bond coat layers, e.g., modify emissivity, reflectance, etc.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the error associated with measurement of the particular quantity). All ranges disclosed herein are inclusive of the endpoints, and the endpoints are independently combinable with each other. It should be appreciated that relative positional terms such as "forward", "aft", "upper", "lower", "above", "below", and the like are with reference to the normal operational attitude of the vehicle and should not be considered otherwise limiting.

Although the different non-limiting embodiments have specific illustrated components, the embodiments of this application are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is rather than defined by the limitations within. Various non-limiting embodiments are disclosed herein; however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed is:

1. A process for applying an oxidation resistant bond coat layer to an article, comprising:
    forming a slurry consisting of components of: one or multiple silicide and boride powders, silica-containing matrix constituents, a viscosity modifier and a liquid medium, wherein the silica-containing matrix constituents consist of at least one of the following: silica, silicon oxycarbide (SiOC), aluminosilicate, borosilicate, and glass, wherein the components of the slurry are present such that the slurry consists of:
        at least 10% to up to 70% by volume of the slurry of at least one silica based material with glass phases having a viscosity of 100 to 10,000,000 poise at a temperature of 1,292° F. (700° C.) to 3,272° F. (1800° C.),
        at least 30% to up to 90% by volume of the slurry of at least one oxygen scavenger selected from the group consisting of at least one silicide of molybdenum, chromium, titanium, hafnium, zirconium, yttrium, and mixtures thereof, and a boride of at least one of the following: molybdenum, tantalum, chromium, titanium, hafnium, zirconium, yttrium and mixtures thereof,
        wherein the viscosity modifier is selected from the group consisting of a mullite, a hafnium oxide, a zirconium oxide, or combination thereof;
    coating an article with the slurry to form a slurry coated article;
    subjecting the slurry coated article to a first heat treatment in an inert atmosphere at a temperature below 2190° F. (1200° C.), wherein during the first heat treatment, healing silica matrix from any one of the silica-based material with glass phases or the silica-containing matrix surrounds the at least one oxygen scavenger; and
    subjecting the slurry coated article to a second heat treatment subsequent to the first heat treatment in air at 2372° F.-3002° F. (1,300° C.-1,650° C.) to form a metal silicide network in the healing silica matrix to form an oxidation resistant bond coat layer on a surface of the article, wherein the healing silica matrix protects the oxygen scavenger from oxidation during the second heat treatment; and
    applying a top coat layer onto the oxidation resistant bond coat layer.

2. The process as recited in claim 1, wherein the top coat layer comprises at least one of the following: refractory oxide material, rare earth oxides, mixed rare earth and refractory metal oxides, alkaline earth oxides, rare earth silicates, refractory metal silicates, mixed metal silicates, borosilicates, aluminum silicates, or mixtures thereof.

3. The process as recited in claim 1, wherein the refractory oxide material is selected from the group consisting of TaxOy (where x=1 to 3 and y=1 to 5), NbxOy (where x=1 to 3 and y=1 to 5), MgO, CaO, SrO, BaO, SiO2, HfO2, TiO2, ZrO2, Al2O3, Y2O3, La2O3, rare earth oxides, yttrium silicate, hafnium silicate, ytterbium silicate and mixtures thereof.

* * * * *